United States Patent [19]

Tanamachi

[11] Patent Number: 5,523,770
[45] Date of Patent: Jun. 4, 1996

[54] PLASMA ADDRESSING DISPLAY DEVICE

[75] Inventor: Shoichi Tanamachi, Kanagawa, Japan

[73] Assignee: Sony Corporation, Tokyo, Japan

[21] Appl. No.: 410,600

[22] Filed: Mar. 27, 1995

Related U.S. Application Data

[63] Continuation of Ser. No. 253,207, Jun. 2, 1994, abandoned, which is a continuation of Ser. No. 942,772, Sep. 10, 1992, abandoned.

[30] Foreign Application Priority Data

Sep. 11, 1991 [JP] Japan ..................... 3-258697

[51] Int. Cl.⁶ ................................. G09G 3/28
[52] U.S. Cl. ................... 345/60; 345/71; 345/87
[58] Field of Search .................. 345/60, 64, 67, 345/61, 62, 63, 65, 66, 68, 71, 87; 315/169.1, 169.4

[56] References Cited

U.S. PATENT DOCUMENTS

| | | | |
|---|---|---|---|
| 4,562,434 | 12/1985 | Amano | 340/775 |
| 4,737,687 | 4/1988 | Shinoda et al. | 315/169.4 |
| 4,896,149 | 1/1990 | Buzak | 340/794 |
| 5,077,553 | 12/1991 | Buzak | 340/771 |
| 5,107,182 | 4/1992 | Sano et al. | 340/775 |

Primary Examiner—Richard Hjerpe
Assistant Examiner—Xiao M. Wu
Attorney, Agent, or Firm—Hill Steadman & Simpson

[57] ABSTRACT

A plurality of signal electrodes D arranged in parallel to each other are formed on a major surface of a first substrate 4. A second substrate 6 is opposed to the first substrate. A plurality of plasma electrodes 7 arranged in parallel to each other and intersecting the signal electrodes D are printed on a major surface of the second substrate 6. In addition, an opaque insulating striped pattern 8 is printed so as to intersect and overlap with the plasma electrodes 7. A liquid crystal layer 5 is sandwiched between the first and second substrates 4 and 6. Further, a plasma chamber 10 having consecutive spaces is formed between the liquid crystal layer 5 and the second substrate 6, and filled with an ionizable gas. The gap space of the plasma chamber 10 can be controlled on the basis of the film thicknesses of the plasma electrodes 7 and the striped pattern 8. The gas is selectively ionized by discharge generated between the two adjacent plasma electrodes 7. The liquid crystal layer 5 positioned at the intersections between the signal electrodes D and the discharge regions is driven with the discharge regions (at which the ionized gas is localized) as the scanning unit. The plasma electrodes 7 are formed by a printed thick film and therefore the electric resistance thereof is low.

19 Claims, 4 Drawing Sheets

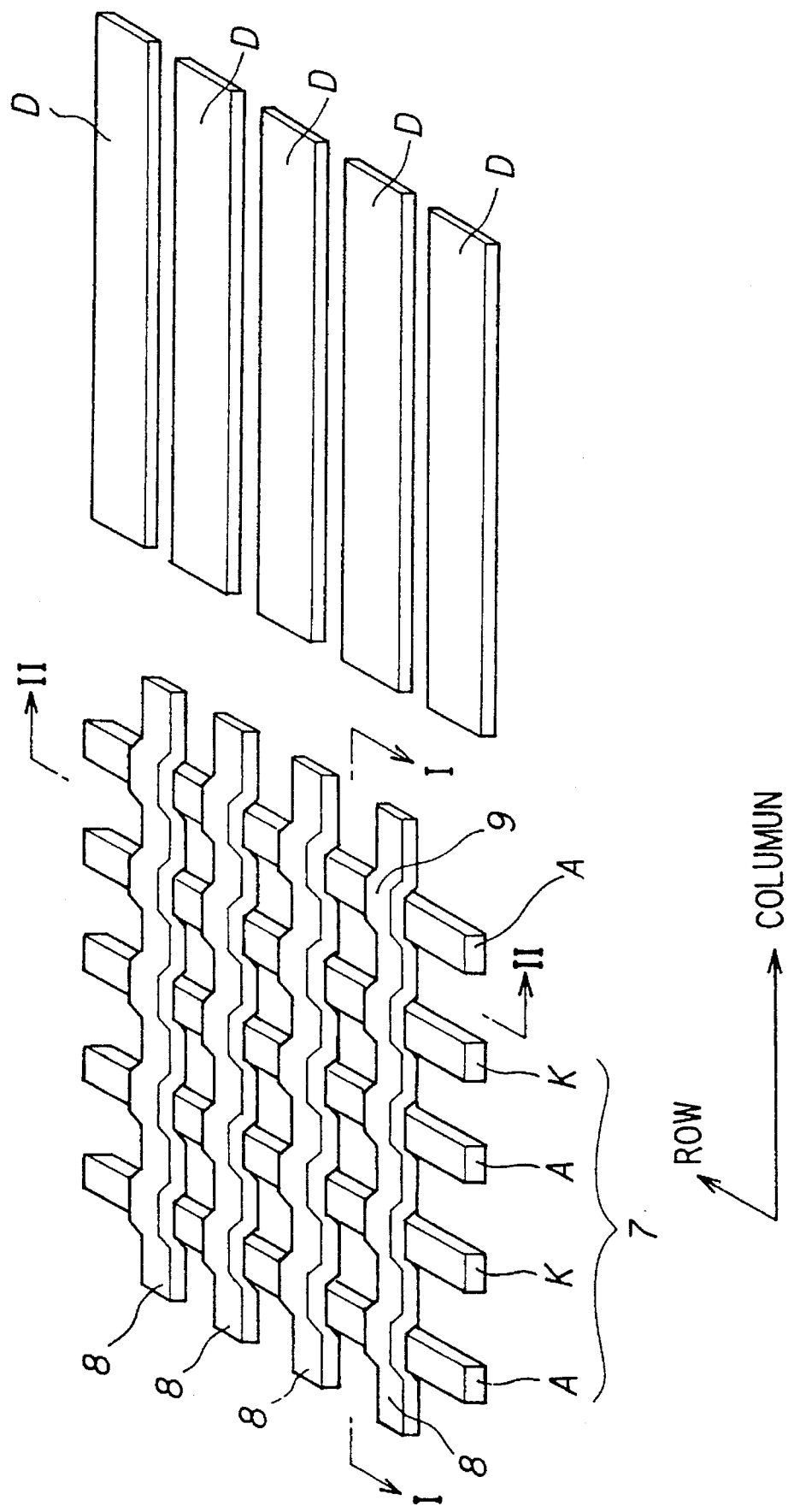

PLASMA ADDRESSING DISPLAY DEVICE

This is a continuation, of application Ser. No. 08/253,207, filed Jun. 2, 1994, now abandoned, which is a continuation of application Ser. No. 07/942,772, filed Sep. 10, 1992, is now abandoned.

BACKGROUND OF THE INVENTION

1. Field of the Invention

The present invention relates to a plasma-addressing display device of a layer built structure which is formed by stacking display cells (e.g. liquid crystal cells) upon plasma cells, and more specifically to an electrode structure of the plasma cells for addressing on the basis of selective plasma discharge.

2. Description of the Related Art

As a means for realizing matrix-type liquid crystal display devices of higher resolution and higher contrast, an active matrix addressing technique has been conventionally known, in which switching elements such as thin film transistors are provided for display pixels (picture elements), respectively and the respective switching elements are driven in the order of lines (rows) of the matrix. In this prior art technique, however, since a great number of the semiconductor switching elements such as thin film transistors must be formed on a substrate, there exists a problem in that the production yield is deteriorated, in particular when a large area of the display device is required.

To overcome the above-mentioned problem, Buzak el al. have proposed a method of adopting plasma cells as addressing switch elements, in place of the thin film transistors, as disclosed in Japanese Published Unexamined (Kokai) Patent Application No. 1-217396, which corresponds to U.S. Pat. Nos. 4,896,149 and 5,077,553 and which are incorporated herein by reference.

The configuration of this prior art plasma-addressing display device for addressing display cells (e.g. liquid crystal cells) by means of plasma cells will be described briefly hereinbelow with reference to the attached drawing. As shown in FIG. 5, the display device is of a layer built structure such that a liquid crystal cell 101 is placed upon a plasma cell 102 via a dielectric partition (e.g. thin glass) 103. The plasma cell 102 is formed by a lower substrate 104 including a plurality of parallel arranged channels 105 formed on the surface thereof. The respective channels 105 are air-tightly sealed by the isolating barrier 103 and filled with an ionizable gas so as to form a plasma chamber 106 having separated spaces, respectively. In other words, the convex portions, 107 formed between the two adjacent channels 105 serve as side walls for separating the plasma chamber 106, respectively and additionally as gap spacers of the substrate 104 in cooperation with the isolating barrier 103. Further, a pair of parallel arranged electrodes 108 and 109 are provided on the bottoms of the channels 105, respectively. A pair of the electrodes are anode and cathode electrodes for ionizing the gas filled within the plasma chamber 106 to generate a discharge plasma.

The liquid crystal cell 101 is provided with a liquid crystal layer 111 sandwiched between the dielectric isolating barrier 103 and another transparent substrate 110. Further, signal electrodes 112 are formed on the inner surface of the transparent substrate 110. The signal electrodes 112 are formed by a transparent conductive thin film, and arranged so as to intersect the plasma chamber 106, respectively. Here, each signal electrode 112 is a column driving unit and each plasma chamber 106 is a row driving unit, respectively. Accordingly, pixels (picture elements) of the matrix arrangement are defined at the respective intersections of both the signal electrodes 112 and the plasma chamber 106. In the above-mentioned display device, the pixels are driven by scanning the plasma chamber 106 for generating a plasma discharge in the lines (rows) and further by applying analog driving voltages to the signal electrodes 112 arranged on the liquid crystal cell (101) side in synchronism with the line (row) order scanning. When a discharge plasma is generated within the plasma chamber 106, the potential of the whole chamber roughly reaches the anode potential. Under these conditions, when the driving voltages are applied to the pixels, electric charges are injected into the liquid crystal layer 111 at the respective pixels through the dielectric isolating barrier 103. Upon completion of the plasma discharge, the potential of the plasma chamber 106 changes to the stray potential, so that the injected electric charges are held at the respective pixels. In other words, since the so-called sampling holding operation can be implemented, the plasma chamber 106 functions as the sampling switches and the liquid crystal layer 111 functions as the sampling capacitances, so that the liquid crystal is activated according to the sampled electric charges to turn on or off the display device in each pixel unit.

In the above-mentioned prior art plasma-addressing display device, however, there exist various problems from the structural and manufacturing standpoints when the device is put into practice. In more detail, the grooves which constitute the plasma chamber have been generally formed on the basis of photolithographic and etching techniques. In practice, however, it is extremely difficult to form the highly precise, fine, dense grooves over a large area of the substrate, and therefore a considerable manufacturing cost is inevitably required. In, addition, the anode and cathode electrodes provided on the bottoms of a the respective grooves have been formed by means of selective etching technique, that is, by forming thin films in accordance with vacuum evaporating or sputtering procedures. Accordingly, a photomask for forming the plasma electrodes is required in addition to a photomask for forming the grooves. Further, it is extremely difficult to align both of the masks at a high precise positional relationship with respect to each other. Additionally, since the length of the thin film electrodes inevitably increases with increasing size of the display device, the resistance of the thin film electrode becomes relatively high and therefore the voltage applied to the electrodes drops along the electrode, thus resulting in another problem in that it is difficult to generate a stable plasma discharge over all of the display device.

SUMMARY OF THE INVENTION

With these problems in mind, therefore, it is the primary object of the present invention to provide a plasma-addressing display device of an improved structure, which can enable an easy manufacture and a stable operation.

To achieve the above-mentioned an other objects, the plasma-addressing display device according to the present invention is configured as follows: the display device comprises a first substrate and a second substrate disposed face to face with respect to each other. A plurality of first electrodes, that is, signal electrodes are formed substantially in parallel to each other on a major surface of the first substrate. A plurality of printed and baked second electrodes, that is, plasma electrodes are formed substantially in parallel to each other and intersecting the signal electrodes on a major surface of the second substrate. In addition, an opaque insulating striped pattern is printed and baked so as to intersect and overlap with the plasma electrodes. An electro-optical material layer such as a liquid crystal layer is interposed between the first and second substrates. Further, a plasma chamber having consecutive spaces is provided between the electro-optical material layer and the second substrate. The plasma chamber is sealed and filled with an ionizable gas. In the above-mentioned configuration, the gas is selectively ionized by a plasma discharge generated between the two adjacent plasma electrodes. The electro-optical material layer positioned at the intersections between the signal electrodes and the discharge regions is driven with the discharge regions (at which the ionized gas is localized) as the scanning unit.

Preferably, the plasma electrodes are formed by a thick nickel film, and the insulating striped pattern is formed by a thick black glass film. Further, it is preferable to form a dielectric layer or partition between the electro-optical material (liquid crystal) layer and the plasma cell, in such a way that the dielectric layer is in contact with the top surfaces (which constitute ribs) of the insulating striped pattern.

In the plasma-addressing display device according to the present invention, the plasma electrodes of a thick film are formed on the surface of the second substrate by a printing procedure, so that the electric resistance of the thick film is low as compared with that of the thin film. Therefore, it is possible to reduce the voltage drop along the plasma electrodes, in particular when the size of the display device is increased. Further, the insulating striped pattern is printed so as to intersect and overlap with the thick film plasma electrodes. The intersection portions between the striped pattern and the plasma electrodes form convex or projection portions which serve as gap spacers. Therefore, a plasma chamber having consecutive spaces formed by the gap spacers therewithin (so-called open cell structure) can be obtained by bonding the second substrate to the electro-optical material layer with the intersection portions interposed between the second substrate and the electro-optical material layer. Even in the case of the above-mentioned open structure, it is of course possible to localize a discharged plasma along the respective plasma electrodes. The display device is driven with the localized discharge regions as scanning unit. As described above, since the plasma electrodes and the insulating striped pattern are both printed in intersectional positional relationship with respect to each other, the alignment precision required for the two printing masks is relatively low, with the result that it is possible to improve the workability and productivity and therefore to reduce the manufacturing cost of the display device.

BRIEF DESCRIPTION OF THE DRAWINGS

FIG. 2 is a perspective illustration showing the arrangement of the plasma electrodes and the stripe pattern, which are both distinctive elements of the present invention, together with the signal electrodes;

DETAILED DESCRIPTION OF THE PREFERRED EMBODIMENTS

An embodiment of the plasma-addressing display device according to the present invention will be described hereinbelow with reference to the attached drawings.

Figure 1A:
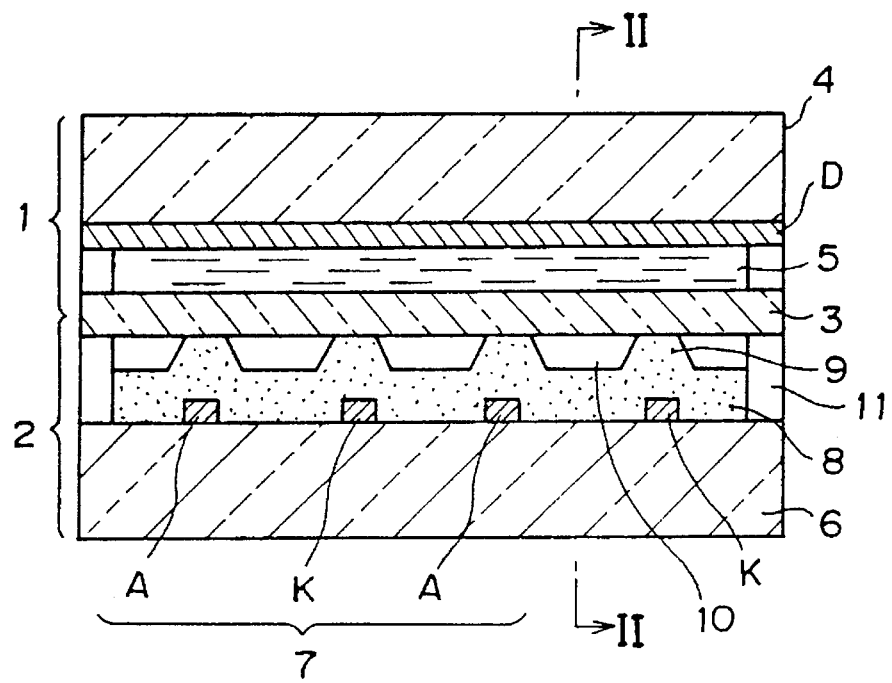
FIG. 1A is a cross sectional view showing an embodiment of the plasma-addressing display device according to the present invention.
Figure 1B:
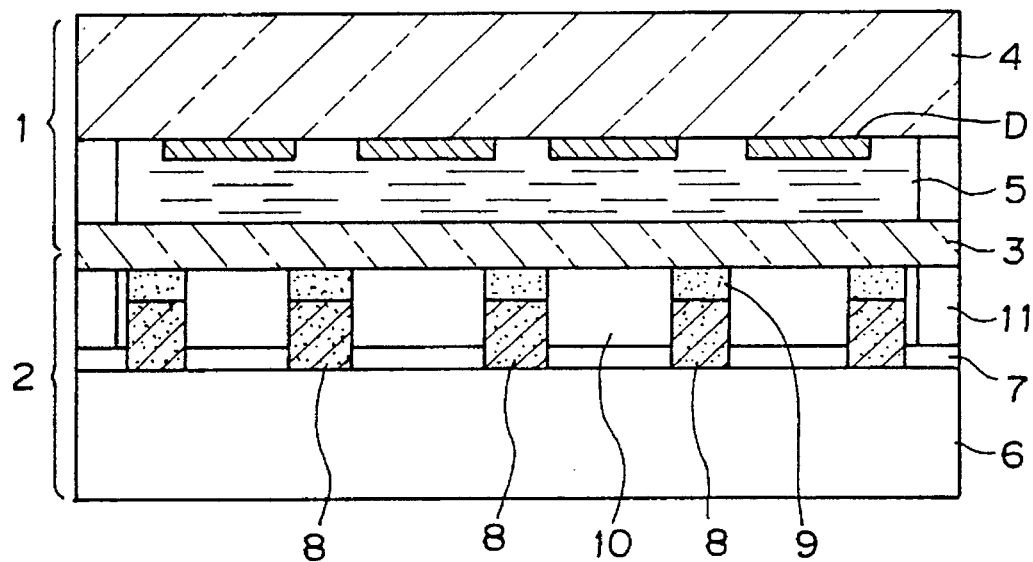
FIG. 1B is another cross sectional view of the same device, taken along the line II—II shown in FIG. 1A.

In FIGS. 1A and 1B, the display device is of a layer built structure, which comprises a display cell (e.g. liquid crystal cell) 1, a plasma cell 2, and a dielectric isolating barrier 3 interposed between the two cells 2 and 3. The liquid crystal cell 1 is formed by a transparent substrate 4. On the inner surface of the transparent substrate 4, a plurality of signal electrodes D are formed and arranged in parallel to each other extending along the column direction of the device. The signal electrodes D are formed by a transparent conductive film (e.g. ITO). The substrate 4 is disposed so as to be opposed (face to face) to the dielectric isolating barrier 3 via a spacer with an appropriate thickness. A gap formed between the substrate 4 and the dielectric isolating barrier 3 is air-tightly sealed and filled with an electro-optical material such as a liquid crystal 5. Here, it is also possible to use a solid material or encapsulated material such as PLZT as the electro-optical material, instead of a fluid material such as the liquid crystal. Where the solid or encapsulated material is adopted, it is possible to eliminate the dielectric isolating barrier 3.

The plasma cell 2 is formed by a lower substrate 6. In the case of a transparent display device, the upper and lower substrates 4 and 6 are both formed of a transparent material. In the case of a reflective display device, however, either one of the substrates may be of a non transparent material. On the inner surface of the lower substrate 6, the anode electrodes A and the cathode electrodes K are formed in alternate positional relationship with respect each other. These electrodes are plasma electrodes 7. Further, these anode electrodes A and the cathode electrodes K are not necessarily fixed in polarity, but switched alternately according to the driving method. These plasma electrodes 7 are arranged in parallel to each other so as to intersect the signal electrodes D extending in the column direction. Therefore, the plasma electrodes 7 extend in the row direction. Further, on the inner surface of the substrate 6, a transparent insulating striped pattern 8 is formed on the plasma electrodes 7 so as to extend in the direction perpendicular to the plasma electrodes 7. In other words, the striped pattern 8 extends in the column direction in the same way as the signal electrodes D. The projections (ribs) 9 at the respective intersections between the plasma electrodes 7 and the striped pattern 8 are in contact with the dielectric isolating barrier 3. That is, these projections 9 function as gap spacers for forming a plasma chamber 10 having consecutive spaces between the dielectric isolating barrier 3 and the substrate 6. The perimeter of the plasma chamber 10 is air-tightly sealed by a sealing material 11. Further, the striped pattern 8 serves to prevent the plasma electrodes 7 from being brought into direct contact with the dielectric isolating barrier 3. An ionizable gas such as helium, neon, argon, etc. or a gaseous mixture thereof is sealed within the plasma chamber 10.

In the display device constructed as described above, when a predetermined voltage is applied between the anode electrodes A and the cathode electrodes K, the gas is ionized and therefore a discharge plasma is generated therebetween. In practice, this discharge plasma exists locally between the two adjacent anode and cathode electrodes A and K so as to form a discharge region. In this device, the liquid crystal cell 1 is driven with this discharge region as a unit of row scanning. In this embodiment, the plasma chamber 10 constitutes consecutive spaces arranged over the substrate in the column direction of the device. Therefore, a problem is surmised such that the resolution of the device is deteriorated due to the diffusion of the ion particles generated by the plasma discharge. However, the above-mentioned diffusion is not generated in practice, and therefore it is possible to realize a localized discharge region. As is well known, the average free travel distance of the ion particles decreases with increasing pressure of the gas sealed within the plasma chamber, so that the ion particles are more localized at higher pressure. Therefore, the localization of the discharge plasma can be controlled by setting the gas pressure high to some extent. On the other hand, there exists a problem in that the discharge starting voltage increases with increasing gas pressure. However, the discharge starting voltage can be adjusted by reducing the interval between the plasma electrodes, that is, between the two adjacent anode and cathode electrodes A and K in inverse proportion to the gas pressure, in accordance with Paschen's law. The optimum values of the gas pressure and the electrode interval differ according to the sort of the gas. However, it is possible to realize plasma discharge at the atmospheric pressure (1 at) by selecting an appropriate gas and setting the gas pressure and the electrode interval both to optimum values. Further, the diffusion of the discharge plasma can be suppressed to some extent by setting the height of the projections 9 of the striped pattern 8 to an appropriate small value to reduce the gap distance of the plasma chamber 10 to some extent.

FIG. 1A is a cross sectional view taken along the column direction of the device, and FIG. 1B is a cross sectional view taken along the row direction of the device or along the line A—A shown in FIG. 1A. As depicted in these figures, the striped pattern 8 is formed in parallel to the signal electrodes D in such a way that each of the striped pattern 8 is arranged roughly midway in each gap formed between the two adjacent signal electrodes D. The striped pattern 8 is formed of an opaque material so as to serve as black striped masks in the gaps formed between the two adjacent signal electrodes D, respectively. In other words, crosstalk generated in the gaps is masked so as not to be visually recognized from the outside.

FIG. 2 is a perspective view showing the arrangement of the plasma electrodes 7 and the striped pattern 8 which are both distinctive elements of the present invention, in addition to the arrangement of the signal electrodes D. Further, FIG. 1A is a cross sectional view taken along the line A—A in FIG. 2; and FIG. 1B is a cross sectional view taken along the line B—B in FIG. 2.

As depicted in FIG. 2, the plasma electrodes 7 are arranged extending in the row direction in parallel to each other at predetermined regular intervals along the column direction. The plasma electrodes 7 can be formed by a screen printing process. For instance, nickel paste (e.g. Nickel Paste 9535 made by Du Pont) with a line width of 50 μm to 200 μm is printed once or repeatedly printed one upon another 2 to 15 times, and further baked in accordance with the ordinary temperature profile to form the nickel electrodes with a film thickness from 5 μm to 200 μm. The peak temperature in the baking treatment is from 570° to 600° C. In other words, it is possible to obtain the plasma electrodes 7 with any required thickness by selectively determining the number of repetitions of the screen printing process. This screen printing process is advantageous when the thin film electrodes required for a large-sized display device must be formed, as compared with the conventional photolithographic or etching technique. Additionally, in the case of the thick film electrodes, since the electric resistance thereof is lower than that of the thin film electrodes, it is possible to neglect the voltage drop along the plasma electrodes 7 even if the length thereof is large.

The opaque insulating striped pattern 8 extends in the column direction perpendicular to the row direction. The striped pattern 8 can be also formed by screen printing. For instance, black glass paste (e.g. Glass Paste 9740 made by Du Pont) with a line width of 50 μm to 200 μm is printed once or repeatedly printed one upon another 2 to 15 times, and further baked in accordance with the ordinary temperature profile to form a black glass thick film. The peak temperature in the baking treatment is from 570° to 600° C. In other words, it is possible to obtain the striped pattern 8 with any required thickness from 50 μm to 200 μm; that is, the height of the projections 9 can be adjusted within a range from 10 μm to 400 μm by selectively determining the number of repetitions of the screen printing process. As already described, the height of the projections 9 determines the gap distance of the plasma chamber. In this embodiment, since the screen printing for forming the insulating striped pattern 8 is effected in the direction perpendicular to the plasma electrodes 7, the required precision of aligning the two printing screens (masks) is relatively low, with the result that it is possible to reduce the manufacturing cost of the device.

On the other hand, the signal electrodes D are formed extending in the column direction. In addition, each of the opaque striped pattern 8 is formed so as to be arranged roughly midway in each gap between the two adjacent signal electrodes D. Therefore, it is possible to mask the crosstalk generated within these gaps effectively so as not to be recognized visually from the outside, as already described, thus improving the display quality of the device. In summary, the signal electrodes D and the plasma electrodes 7 are arranged in intersectional positional relationship with respect to each other so as to be spaced apart from each other in both the vertical and horizontal directions of the display device, respectively.

The operation of the plasma-addressing display device according to the present invention will be described hereinbelow with reference to FIG. 3 which shows a driving circuit. As shown, the driving circuit is composed of a signal circuit 21, a scanning circuit 22, and a control circuit 23. A plurality of signal electrodes D1 to Dm are connected to the signal circuit 21 via a buffer, respectively. On the other hand, a plurality of cathode electrodes K1 to Kn of the plasma electrodes are connected to the scanning circuit 22 via another buffer, respectively, while the anode electrodes A1 to An are all grounded. These signal and scanning circuits 21 and 22 are controlled by the control circuit 23 so as to be synchronized with each other. The cathode electrodes K1 to Kn are selected by the scanning circuit 22 in the order of rows. For instance, when the cathode electrode K1 is selected, a plasma discharge is generated between the selected cathode electrode K1 and the adjacent anode electrode A1, so that a local discharge region is formed. This formed discharge region constitutes a row scanning unit. On the other hand, analog driving voltages are applied to the respective signal electrodes D1 to Dm in synchronism with the row sequence scanning. Therefore, each of the signal electrodes D1 to Dm constitutes a column driving unit. Pixels (e.g. assemblies 24) are formed separately, at the intersections between the column driving unit and the row scanning unit.

Figure 3:
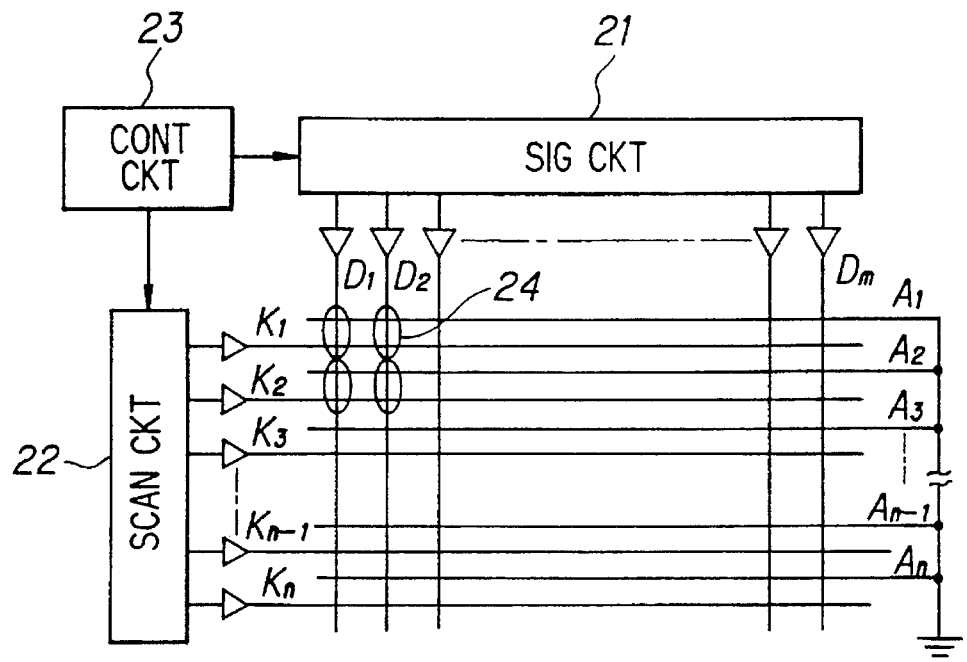
FIG. 3 is a schematic block diagram showing an example of the driving circuit for driving the display device shown in FIGS. 1A and 1B.
Figure 4:
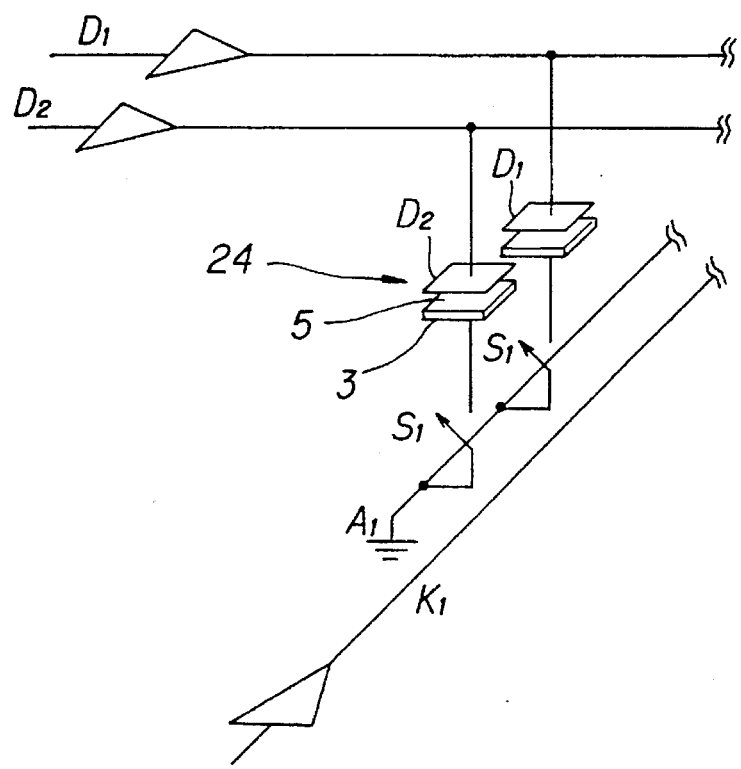
FIG. 4 is a perspective illustration for assistance in explaining the operation of the two pixels separated form the display device shown in FIGS. 1A and 1B.
Figure 5:
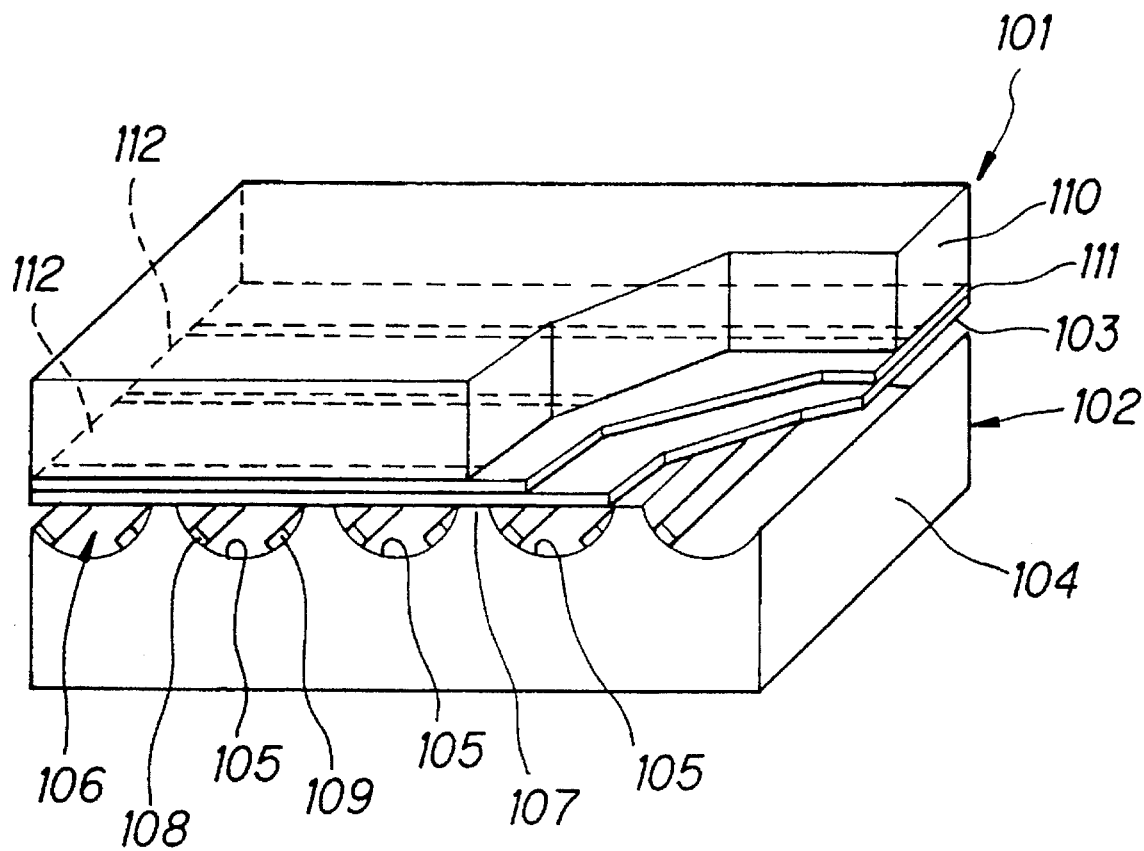
FIG. 5 is a perspective, partially broken view showing an example of prior art plasma-addressing display devices.

FIG. 4 shows only two pixels shown in FIG. 3, in which only two signal electrodes D1 and D2, a single cathode electrode K1, and a single anode electrode A1 are shown to facilitate understanding of the operation thereof. The respective pixels 24 are of a layer-built structure, in which the signal electrode D1 or D2, the liquid crystal layer 5, the dielectric layer 3, and the plasma discharge region are stacked one upon another. When activated, the potential of the discharge region substantially reaches the anode potential. Upon completion of the plasma discharge, the potential of the discharge region reaches the stray potential. As described above, since the discharge region functions as a plasma switching element, the discharge region is represented by a switch symbol S1 in FIG. 4. On the other hand, the liquid crystal layer 5 sandwiched between the signal electrode D1 or D2 and the dielectric isolating barrier 3 functions as a sampling capacitance. When the plasma switches S1 are turned on by the row sequence scanning, the analog driving voltages are held by the sampling capacitances, so that the respective pixels are turned on or off gradually according to the held voltage levels. After the plasma switches S1 are turned off, the driving voltages are held in the sampling capacitors for enabling an active matrix driving operation of the image display device.

Further, in the case of a color display device, a plurality of color filters are formed so as to be associated with the signal electrodes D, respectively.

As described above, in the plasma-addressing display device according to the present invention, since the plasma electrodes are formed by printing techniques or procedures, it is possible to reduce the electric resistance of the plasma electrodes in comparison with that of the prior art device. Accordingly, there exists such an advantage that even if the device is enlarged, the voltage drop along the plasma electrodes can be effectively reduced, thus enabling a stable plasma discharge. In addition, since the plasma electrodes are formed by the printing process, being different form the prior art method (vacuum evaporation or sputtering), there exists another advantage such that the cost of manufacturing a large-sized display device can be reduced. Further, since the opaque insulating striped pattern can be formed perpendicular to the plasma electrodes by repeating the same printing procedure, it is possible to control the gap of the plasma chamber in the plasma cell on the basis of the thickness of the striped pattern. Therefore, the plasma cells can be formed into so-called open cell structures, and thereby it is possible to simplify the manufacturing process of the device as compared with the prior art device. Furthermore, since the stripe pattern is printed perpendicular to the plasma electrodes, a high alignment precision is not required for the printing masks, thus improving the workability and productivity of the display device.

Although other modifications and changes may be suggested by those skilled in the art, it is the intention of the inventors to embody within the patent warranted hereon all changes and modifications as reasonably and properly come within the scope of their contribution to the art.

What is claimed is:

1. A plasma-addressing display device, comprising:
   a first substrate having a plurality of first electrodes arranged substantially in parallel to each other on a major surface thereof;
   a second substrate opposed to said first substrate;
   an electro-optical material cell positioned between inner surfaces of said first and second substrates;
   a discharge chamber formed in a gap between said electro-optical material layer and said second substrate and containing an ionizable gas;
   a plurality of second electrodes arranged substantially in parallel to each other on a major surface of said second substrate, said plurality of second electrodes being substantially perpendicular to said first electrodes; and
   a plurality of stripes of insulating material arranged substantially parallel to one other and substantially perpendicular to said plurality of second electrodes, said plurality of stripes of insulating material lying directly on and overlapping said second electrodes on said second substrate so that overlapping regions are formed where said plurality of stripes overlap said second electrodes, said electro-optical material cell being in contact with said plurality of stripes at said overlapping regions to define a height of said gap of the discharge chamber.

2. The plasma-addressing display device as claimed in claim 1, wherein said electro-optical material cell includes a dielectric material layer and an electro-optical liquid, wherein said dielectric material layer is arranged between said electro-optical liquid and said discharge chamber to form a barrier between said electro-optical material layer and the ionizable gas in said discharge chamber, and said dielectric material layer is in contact with said overlapping regions of said plurality of stripes.

3. The plasma-addressing display device as claimed in claim 1, wherein said plurality of stripes of insulating material are opaque.

4. The plasma-addressing display device as claimed in claim 1, wherein the second electrodes and said plurality of stripes of insulating material are both formed in accordance with printing procedures.

5. The plasma-addressing display device as claimed in claim 1, wherein the second electrodes are a relatively thick layer formed of nickel.

6. The plasma-addressing display device as claimed in claim 1, wherein said plurality of stripes of insulating material are of black glass.

7. The plasma-addressing display device as claimed in claim 1, wherein the second electrodes are composed of a plurality of pairs of anode and cathode electrodes.

8. The plasma-addressing display device as claimed in claim 1, which further comprises a plurality of color filters each associated with each first electrode.

9. A plasma-addressing display device as claimed in claim 1, wherein said plurality of stripes are substantially straight.

10. A plasma-addressing display device as claimed in claim 1, wherein said discharge chambers are elongated and extend parallel to and substantially a length of said plurality of stripes.

11. A plasma-addressing display device as claimed in claim 1, wherein said plurality of stripes of insulating material are spaced from said electro-optical material cell at portions between said overlapping regions and is in contact with said electro-optical material layer at said overlapping regions along each of said plurality of stripes.

12. An addressing structure for an electro-optical material in a display device, comprising:
   a substrate having a plurality of elongated electrodes arranged in parallel on a major surface thereof;
   a dielectric material layer opposed to said substrate;
   an electro-optical material on said dielectric material layer opposed to said substrate;
   a plurality of elongated insulating stripes disposed extending substantially in perpendicular to the electrodes and lying directly on the electrodes to form overlapping regions, said dielectric material layer being supported on said overlapping regions of said plurality of insulating stripes to define a height of discharge space between the substrate and the dielectric material layer; and an ionizable gas filled in said discharge space between said substrate and said dielectric material layer.

13. The addressing structure as claimed in claim 12, wherein said electrodes and insulating stripes are both formed by printing procedures.

14. An electro-optical device, comprising:

an electro-optical cell including a first substrate, a dielectric material layer opposed to the first substrate, and an electro-optical material layer disposed between the first substrate and the dielectric material layer, said first substrate having a plurality of first electrodes arranged substantially in parallel and non-overlapping positional relationship with respect to each other on a major surface thereof; and a discharge cell including a second substrate opposed to the dielectric material layer, and an ionizable gas contained in the discharge cell, the second substrate having a plurality of second electrodes arranged substantially in parallel and non-overlapping positional relationship with respect each other on a major surface thereof, and insulating stripes overlapping directly on the second electrodes perpendicularly so that a combined height of the insulating stripes and the second electrodes at overlapping regions define a plasma discharge space.

15. The electro-optical device as claimed in claim 14, wherein the insulating layers constitute a striped pattern for forming a wall to support the dielectric material layer.

16. The electro-optical device as claimed in claim 14, wherein the second electrode is a printed nickel layer.

17. The electro-optical device as claimed in claim 14, wherein the insulating stripes are of a printed black glass.

18. A plasma-addressing display, comprising:

a substrate having a major surface;

strip-shaped anode electrodes and cathode electrodes formed on said major surface in alternation substantially in parallel with one another;

a striped pattern of insulating material formed on said major surface over and directly on said strip-shaped anode electrodes and cathode electrodes, said stripped pattern being straight strips extending substantially parallel to one another and substantially perpendicular to said strip-shaped anode electrodes and cathode electrodes, said striped pattern having first portions extending to a first height above said major surface between said striped shaped anode electrodes and cathode electrodes, said striped pattern having second portions overlying said striped-shaped anode electrodes and cathode electrodes and thereby extending to a second height which is greater than said first height above said major surface at said strip-shaped anode electrodes and cathode electrodes;

an isolating barrier on said second portions of said striped pattern and supported at said second height on said second portions of said striped pattern that overlie said strip-shaped anode electrodes and cathode electrodes, said first portions being free of said isolating barrier;

an electro-optical material on said isolating barrier opposed said substrate;

an ionizable gas between said substrate and said isolating barrier.

19. A plasma-addressing display as claimed in claim 18, further comprising:

a display cell on said isolating barrier opposite said substrate, said display cell including;

a transparent substrate spaced from said isolating barrier, electrodes on at least one of said isolating barrier and said transparent substrate, and electro-optical material between said isolating layer and said transparent substrate.

* * * * *